US012361128B2

(12) United States Patent
Shah

(10) Patent No.: US 12,361,128 B2
(45) Date of Patent: Jul. 15, 2025

(54) METHOD AND APPARATUS FOR DETECTING MALWARE VIA ANALYSIS OF A SCREEN CAPTURE

(71) Applicant: McAfee, LLC, San Jose, CA (US)

(72) Inventor: Hardik Shah, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 18/649,457

(22) Filed: Apr. 29, 2024

(65) Prior Publication Data

US 2024/0273201 A1    Aug. 15, 2024

Related U.S. Application Data

(63) Continuation of application No. 17/970,404, filed on Oct. 20, 2022, now Pat. No. 12,008,103, which is a continuation of application No. 17/018,916, filed on Sep. 11, 2020, now Pat. No. 11,514,161.

(51) Int. Cl.
| | |
|---|---|
| *G06F 21/56* | (2013.01) |
| *G06F 11/32* | (2006.01) |
| *G06F 21/54* | (2013.01) |
| *G06F 21/55* | (2013.01) |

(52) U.S. Cl.
CPC .......... *G06F 21/564* (2013.01); *G06F 11/327* (2013.01); *G06F 21/54* (2013.01); *G06F 21/554* (2013.01); *G06F 21/565* (2013.01)

(58) Field of Classification Search
USPC .......................................................... 726/24
See application file for complete search history.

(56) References Cited

U.S. PATENT DOCUMENTS

| | | |
|---|---|---|
| 8,392,705 B2 | 3/2013 | Borden |
| 8,448,245 B2 * | 5/2013 | Banerjee ................ G06F 21/51 |
| | | 709/224 |
| 8,832,096 B1 | 9/2014 | Jing |

(Continued)

FOREIGN PATENT DOCUMENTS

| | | | |
|---|---|---|---|
| CN | 102549560 A * | 7/2012 | ............. G06F 21/53 |
| DE | 202010018488 U1 | 1/2017 | |
| WO | 2017173100 A1 | 10/2017 | |

OTHER PUBLICATIONS

United States Patent and Trademark Office, "Non-Final Office Action," issued in connection with U.S. Appl. No. 17/018,916 on Nov. 10, 2021, 17 pages.

(Continued)

*Primary Examiner* — Sakinah White Taylor
(74) *Attorney, Agent, or Firm* — Hanley, Flight & Zimmerman, LLC

(57) ABSTRACT

Methods, apparatus, systems and articles of manufacture for detecting malware via analysis of a screen capture are disclosed. An example apparatus includes at least one memory, instructions, and processor circuitry to execute the instructions. The processor circuitry is to detect execution of a process, capture a portion of a screen buffer as a captured image, after the execution of the process is detected, analyze the captured image to determine an image similarity to a stored image in a database, the database to at least store malicious images, and perform a responsive action when the image similarity satisfies a similarity threshold.

20 Claims, 7 Drawing Sheets

(56) References Cited

U.S. PATENT DOCUMENTS

| | | | |
|---|---|---|---|
| 8,903,941 B1* | 12/2014 | Kaul | G06F 21/566 |
| | | | 709/224 |
| 10,051,103 B1 | 8/2018 | Gordon | |
| 10,120,775 B2 | 11/2018 | Jayaraman et al. | |
| 10,579,796 B1 | 3/2020 | Neel | |
| 11,184,379 B1* | 11/2021 | Kjar | G06F 21/564 |
| 11,514,161 B2 | 11/2022 | Shah | |
| 11,698,990 B2 | 7/2023 | McFall et al. | |
| 2005/0210008 A1* | 9/2005 | Tran | G06F 16/9538 |
| 2009/0222763 A1* | 9/2009 | Dukhon | G06F 3/04845 |
| | | | 715/808 |
| 2010/0058472 A1 | 3/2010 | Dotan | |
| 2010/0138775 A1 | 6/2010 | Kohen et al. | |
| 2013/0295894 A1 | 11/2013 | Rhoads | |
| 2014/0201838 A1 | 7/2014 | Varsanyi | |
| 2014/0359766 A1 | 12/2014 | Klein et al. | |
| 2015/0169634 A1 | 6/2015 | Li | |
| 2017/0063906 A1 | 3/2017 | Muddu et al. | |
| 2017/0091467 A1 | 3/2017 | Pogorelik | |
| 2017/0118394 A1 | 4/2017 | Van Hoeckel | |
| 2017/0223046 A1 | 8/2017 | Singh | |
| 2018/0061115 A1 | 3/2018 | Harris et al. | |
| 2019/0081873 A1* | 3/2019 | Kraft | H04L 63/1433 |
| 2019/0208412 A1 | 7/2019 | Lord et al. | |
| 2020/0302029 A1 | 9/2020 | Holm | |
| 2021/0203693 A1* | 7/2021 | Clausen | H04L 63/1425 |
| 2021/0342979 A1 | 11/2021 | Lee | |
| 2022/0083658 A1 | 3/2022 | Shah | |
| 2022/0138972 A1 | 5/2022 | Rattner | |

OTHER PUBLICATIONS

United States Patent and Trademark Office, "Final Office Action," issued in connection with U.S. Appl. No. 17/018,916 on Mar. 29, 2022, 17 pages.

United States Patent and Trademark Office, "Notice of Allowance and Fee(s) Due," issued in connection with U.S. Appl. No. 17/018,916, dated Jul. 25, 2022, 15 pages.

United States Patent and Trademark Office, "Non-Final Office Action," issued in connection with U.S. Appl. No. 17/970,404, dated May 11, 2023, 18 pages.

United States Patent and Trademark Office, "Final Office Action," issued in connection with U.S. Appl. No. 17/970,404, mailed on Sep. 27, 2023, 20 pages.

United States Patent and Trademark Office, "Notice of Allowance and Fee(s) Due," issued in connection with U.S. Appl. No. 17/970,404, dated Jan. 31, 2024, 21 pages.

United States Patent and Trademark Office, "Corrected Notice of Allowability," issued in connection with U.S. Appl. No. 17/970,404, dated Apr. 10, 2024, 14 pages.

\* cited by examiner

METHOD AND APPARATUS FOR DETECTING MALWARE VIA ANALYSIS OF A SCREEN CAPTURE

RELATED APPLICATION

This patent arises from a continuation of U.S. patent application Ser. No. 17/970,404, now U.S. Pat. No. 12,008,103 filed on Oct. 20, 2022, which is a continuation of U.S. patent application Ser. No. 17/018,916, now U.S. Pat. No. 11,514,161, which was filed on Sep. 11, 2020. U.S. patent application Ser. No. 17/970,404 and U.S. Pat. No. 11,514,161 are hereby incorporated herein by reference in their entirety. Priority to U.S. application Ser. No. 17/018,916 and U.S. application Ser. No. 17/970,404 is hereby claimed.

FIELD OF THE DISCLOSURE

This disclosure relates generally to malware detection and, more particularly, to a method and apparatus for detecting malware via analysis of a screen capture.

BACKGROUND

Some business computer applications, such as spreadsheet programs (e.g., Microsoft® Excel®), word processor programs (e.g., Microsoft® Word®), etc. allow for execution of macros. Macros are a set of rules or a command sequence that automates various business application tasks. Unfortunately, such macros have become heavily used in malware campaigns to run malicious code.

Figure 1:
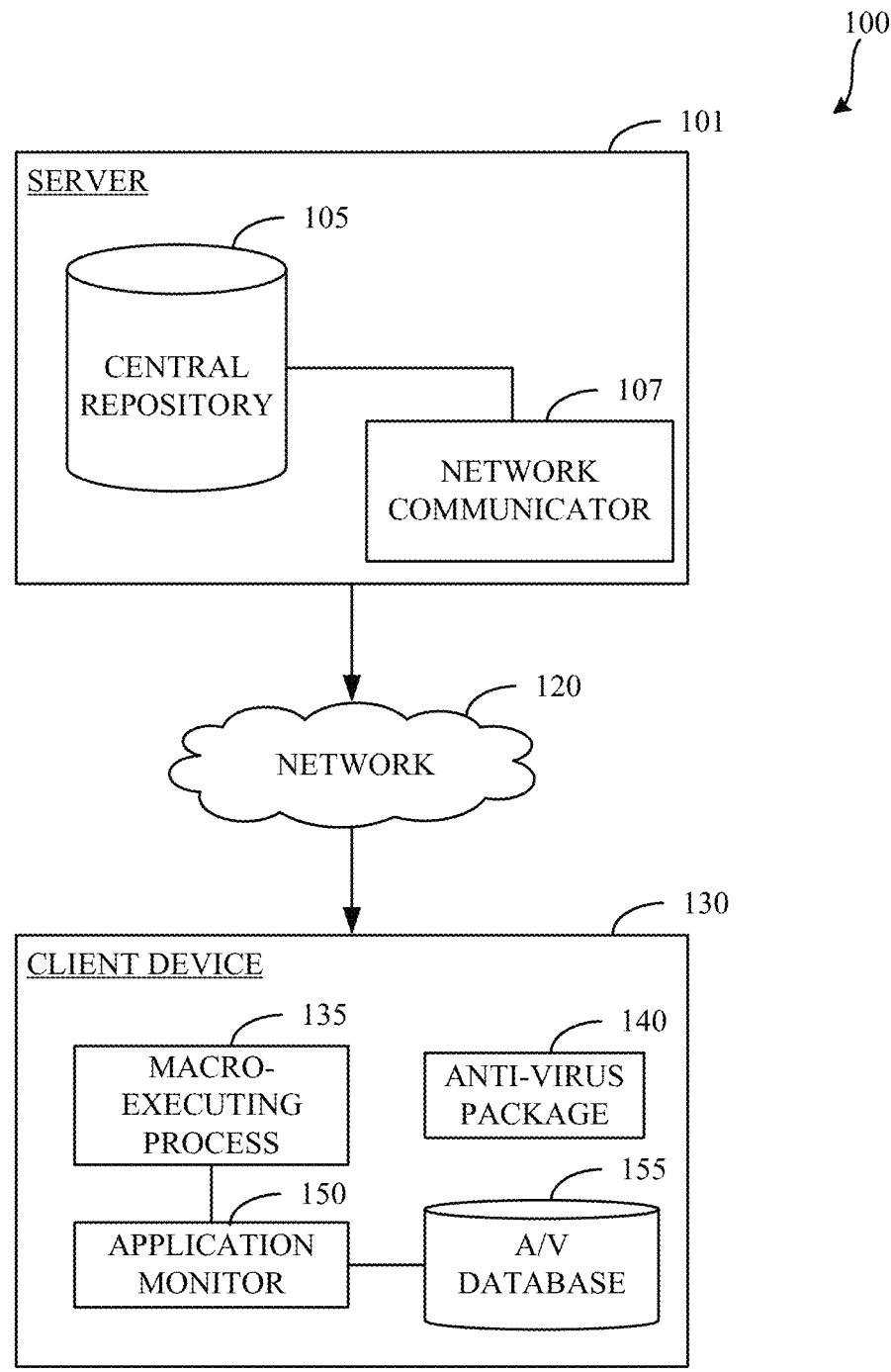
FIG. 1 is a block diagram illustrating interaction between a server and a user device for macro malware detection to perform malware detection at an application monitor of the user device.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Example methods and apparatus disclosed herein detect malware through the analysis of a screen capture of an interface of a business application. Such business applications may execute macros which, in some cases, can be malicious. Macros are a set of rules or command sequence which simplify and automate various Microsoft Office operations. Macros are heavily used in malware campaigns to run malicious code on an unsuspecting user's computing device. By default, Microsoft® office programs prevent macros from being executed during the opening of a file and, instead, request the user to enable execution of the macro (which may be malicious). Often, this makes the goal of the malicious attack to convince the user to click on an "Enable Content" button, starting the execution of the malicious macro. Once a user has clicked the button, the execution of the macro and malicious code begins on the system. To attempt to manipulate the user, malicious actors use a variety of text like, "This document is protected," "Enable content to adjust this document to your version of Microsoft® Word®," "This document created in an earlier version of Microsoft® Word®," and many more. This attack can be prevented by leveraging the time between the opening of a Microsoft® Office application and the moment an unsuspecting user acts to unintentionally initiate the execution of the malicious code.

Known approaches to the problem of malicious macros use various analysis techniques including, for example, monitoring Microsoft Office files when downloaded to the system, and attempting to analyze the macro code itself. Sometimes, this technique requires the execution of the malicious code and thus creates a scenario in which a user can get infected, even without intentionally opening the malicious document. Such approaches are often computationally intensive and, in some examples, can easily be evaded.

Example approaches disclosed herein utilize a list of macro-executing processes that are monitored for initialization, such as "winword.exe" or "excel.exe." An image (e.g., a screen capture) is captured when the execution of the macro-executing process is detected. The image is analyzed and compared for similarities with stored images of interfaces of the macro-executing process that had been previously identified as being malicious. To determine image similarity, image similarity analysis techniques are used such as, for example, Scale-Invariant Feature Transform (SIFT), Structural Similarity Index Measure (SSIM), etc. If a match is found that meets or exceeds a similarity threshold, the document is deemed malicious, and a responsive action is taken. It is unlikely that a perfect similarity score will be found and, as a result, the similarity threshold will be adjusted to anticipate a level of inherent image similarity. If the similarity score from the initial screen capture analysis does not meet or exceed the similarity threshold, a secondary process of textual analysis may be utilized to detect, for example, interfaces that are visually different from prior known malicious interfaces, but use similar text and/or instructions.

Example approaches disclosed herein attempt to identify text elements present in the captured image using, for example, Optical Character Recognition (OCR) to translate the screen capture text into a searchable medium. If the captured image includes text asking the user to, for example, "Enable Content," or other text indicative of a potential malware attack, the text of the screen capture is analyzed further in search of textual patterns known to be malicious. Example text could include, "This document is protected," or "Enable content to adjust this document to your version of Microsoft® Word®." The text searched for can change over time as different attacks are identified. If a match is found, the document can be deemed malicious, and a responsive action can be taken.

Upon the macro-executing process being deemed malicious, a responsive action, or a combination of responsive actions can be taken. In some examples, further interaction by the user to the macro-executing process can be halted and/or blocked. In some examples, a message may be transmitted to an installed anti-virus program, or a central monitoring facility. In some examples, a warning may be presented (e.g., in the form of a pop-up message) to warn the user of the danger of continued use of the document. In some examples, multiple responsive actions may be performed. In some examples, the different responsive actions are selected for execution based on the similarity scores and one or more similarity thresholds. For example, in the event that the similarity score is below a first similarity threshold but above a second similarity threshold (e.g., indicating a medium level of similarity to a malicious interface), a warning message may be presented to the user; whereas if the similarity score is above the first similarity threshold (e.g., indicating high degree of similarity to a malicious interface), the macro-executing process may simply be terminated.

Using the example approaches disclosed herein, by analyzing a screen capture as soon as the macro-executing process is detected, and before a user clicks on an "Enable Content" button, a document can be identified as containing a malicious macro before the malicious macro can execute. Example approaches disclosed herein do not require execution and/or analysis of the macro code itself. In addition, example approaches disclosed herein are able to more quickly prevent execution of malicious macros before they are executed (as opposed to waiting for the macro to be executed and then detecting the malicious activity.) Advantageously, because interfaces of malicious macros and text associated with those interface can be synchronized to a central facility and/or otherwise shared with other computing systems, such other computing systems can more quickly detect malicious macro interfaces.

FIG. 1 is a block diagram illustrating an example environment of use 100 in which a macro-executing process 135 is executed at a client device 130 and is monitored by an application monitor 150. The example environment of use 100 includes a server 101, which includes a central repository 105 and a network communicator 107. The server 101 communicates with the client device 130 via a network 120. The example client device 130 of FIG. 1 includes a macro-executing process 135, an anti-virus package 140, an application monitor 150, and an A/V database 155.

The example server 101 of the illustrated example of FIG. 1 stores and processes data associated with the macro-execution detection process. Client device 130 and server 101 synchronize, share, and communicate data and information across network 120. Information used in the anti-virus process 140 may also be transferred from the client device 130 and stored on the server 101, where further analysis may take place. Data communicated from the client device 130 may also be deleted from the server 101 if, for example, such data is no longer useful. For clarity, in FIG. 1 a single connection between the client device 130 and the server device 101 is shown, but at any given moment, many different client devices may be communicating with and accessing data from the server 101.

The example central repository 105 of the illustrated example of FIG. 1 stores example screen captures and text strings known to be malicious. In some examples, the central repository 105 also stores screen captures and text strings from processes identified to contain the execution of malicious macros. The example central repository 105 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example central repository 105 may be in any data format such as, for example, binary data, comma delimited data, tab delimited data, structured query language (SQL) structures, etc. While, in the illustrated example, the central repository 105 is illustrated as a single device, the example central repository 105 and/or any other data storage devices described herein may be implemented by any number and/or type(s) of memories.

The example network communicator 107 of the illustrated example of FIG. 1 enables the server 101 to communicate with the client device 130 (e.g., via the network 120). In some examples, this data is synchronized periodically, (e.g., hourly, daily, weekly), while in other examples, the data can be synchronized a-periodically (e.g., after a malicious attack is identified). In other examples, network communicator 107 handles the transfer of new malicious macro interface examples between the central repository 105 and the client device 130.

The example network 120 of the illustrated example of FIG. 1 can be any network over which data can be transferred and communicated including, for example, the Internet. Client device 130 and server 101 communicate with each other via the network 120.

The example client device 130 of the illustrated example of FIG. 1 is any programmable device with the ability to execute an application including, for example, the macro-executing process 135. In some examples, client device 130 is implemented using a desktop computer, laptop, tablet computer, or smartphone.

The example macro-executing process 135 of the illustrated example of FIG. 1 is implemented by executable instructions that may be executed by the client device 130.

In this manner, macro-executing process 135 may be implemented by any program with the ability to execute a macro such as, for example, Microsoft® Word®, Microsoft® Excel®, or Microsoft® PowerPoint®. As used herein, a macro is defined to be an instruction and/or set of instructions that are included in a document that is to be read by the macro-executing process 135. That is, the macro is included as a component of the macro-executing process 135, but is included in a document (e.g., a file) that is separate from the macro-executing process 135.

The example anti-virus package 140 of the illustrated example of FIG. 1 monitors client device 130 for malicious activity and performs responsive actions in response to detection of such malicious activity. In examples disclosed herein, the example anti-virus package accesses an image associated with the process (e.g., the application interface screen capture) that is captured by the application monitor 150 in response to detecting malicious activity. Such access and subsequent analysis enables the anti-virus package to supplement the A/V database 155 with information that leads to an earlier detection of a malicious macro by the application monitor 150.

The example application monitor 150 of the illustrated example of FIG. 1 monitors for execution of the macro-executing process 135. For example, the application monitor 150 monitors for processes such as "winword.exe," or "excel.exe," which are known to indicate a macro-executing process. In some examples, the file extension of a file opened by the macro-executing process is analyzed to determine if the file extension indicates the opening of a document that includes macros. For example, the Microsoft Word file extension ".docm" indicates that the file is a macro-enabled document, whereas the file extension ".doc" does not indicate that the file is a macro-enabled document. In some examples, a cursory scan of the file can be performed to determine the presence of a macro.

The A/V database 155 of the illustrated example of FIG. 1 includes example screen captures and text strings known to be malicious. A/V database 155 can also include screen captures and text strings from processes identified to contain the execution of malicious macros. A/V database 155 contains the screen captures and text strings used by similarity analyzer 210 and text analyzer 220 of FIG. 2 as the application monitor 150 analyzes the interface of the macro-executing process 135 to determine whether there is a malicious macro. The example A/V database 155 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example A/V database 155 may be in any data format such as, for example, binary data, comma delimited data, tab delimited data, structured query language (SQL) structures, etc. While, in the illustrated example, the A/V database 155 is illustrated as a single device, the example A/V database 155 and/or any other data storage devices described herein may be implemented by any number and/or type(s) of memories.

Figure 2:
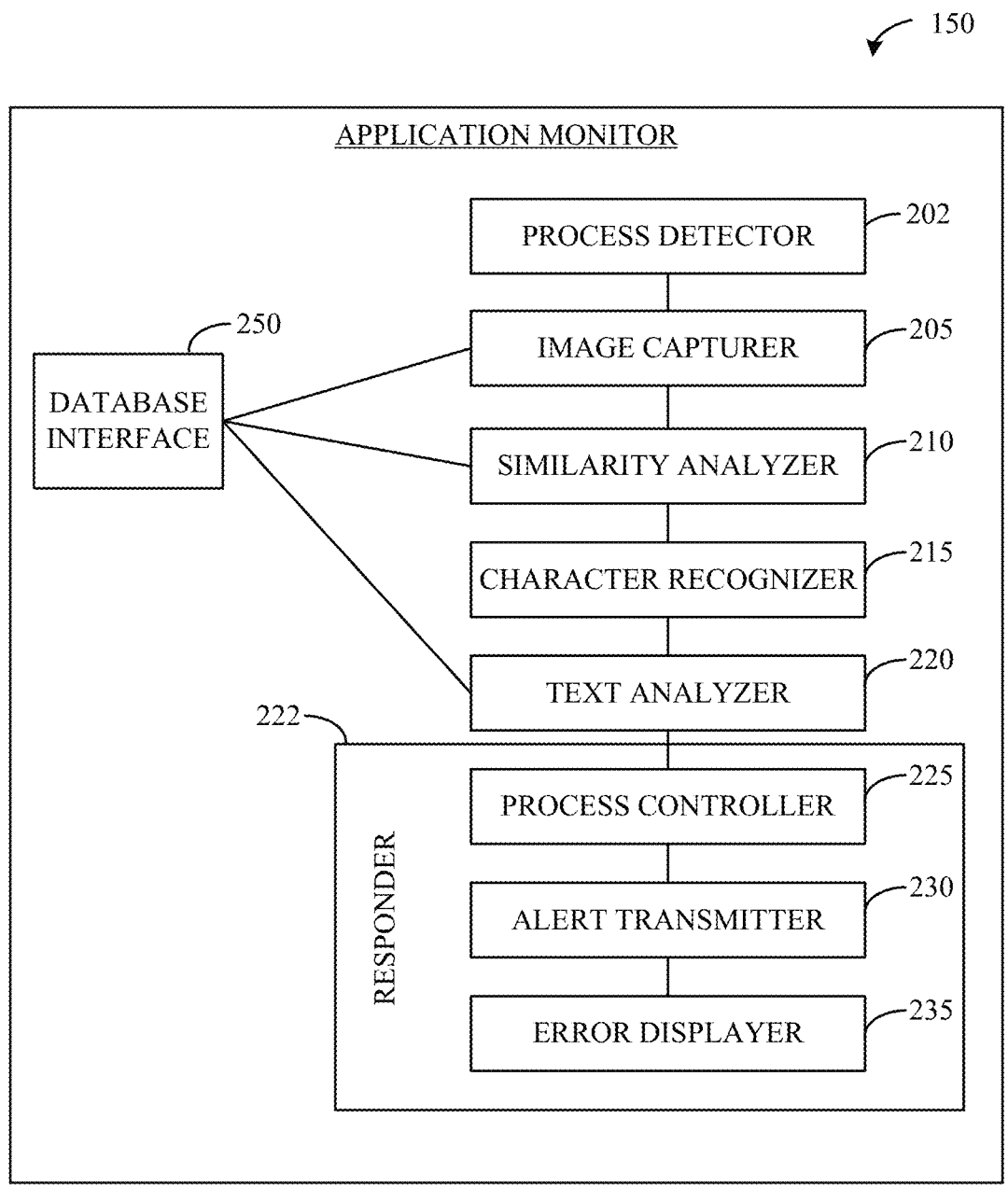
FIG. 2 is a block diagram illustrating an example implementation of the example application monitor of FIG. 1.

FIG. 2 is a block diagram illustrating an example implementation of the example application monitor 150 of FIG. 1. The example application monitor 150 of FIG. 2 includes a process detector 202, an image capturer 205, a similarity analyzer 210, a character recognizer 215, a text analyzer 220, and a responder 222. The example responder 222 may be implemented by an example process controller 225, an alert transmitter 230, and an error displayer 235.

The example process detector 202 of the illustrated example of FIG. 2 detects the execution of macro-enabled processes on client device 130. In some examples, this is achieved by detecting processes executing on the user device, and comparing a process name (and/or an executable name associated with the process) to a list of known macro-executing processes stored in the antivirus database 155. The list of known macro-executing processes may include, for example, "winword.exe," "excel.exe," etc. which indicate the execution of a macro-executing process. In some examples, the file extension of the opened file is checked to see if the extension indicates the opening of a document that includes macros (e.g., macro-enabled document). In some examples, a scan of the file can be performed to determine the presence of a macro. In some examples, the process detector 202 implements means for processing.

The example image capturer 205 of the illustrated example of FIG. 2 captures an image of the user interface displayed on the screen. In some examples, screen buffer data describing the content present on a display of the client device is used for screen capture. In some examples, the screen capture is cropped (e.g., reduced) to include only the interface of the macro-executing process. In other examples, the screen capture is cropped further to contain only the application interface of the macro-executing process (e.g., to exclude menu sections of the application interface, to exclude ribbon sections of the application interface, etc.). The image can be cropped using techniques such as Canny Edge Detection. In some examples, the image capturer 205 implements means for capturing.

The example similarity analyzer 210 of the illustrated example of FIG. 2 analyzes using, for example, Scale-Invariant Feature Transform (SIFT), Structural Similarity Index Measure (SSIM), to generate a similarity score for the captured image against one or more images stored in the A/V database 155. Based on whether the similarity score meets or exceeds a similarity threshold, the example similarity analyzer 210 determines whether an image match is found. In some examples, the similarity analyzer 210 implements means for analyzing.

The example character recognizer 215 of the illustrated example of FIG. 2 uses for example, Optical Character Recognition (OCR) to output searchable text corresponding to the characters present in the image. The example character recognizer 215 searches the captured image for text elements present in the user interface and converts the visual text elements into searchable text. In some examples, the character recognizer 215 implements means for recognizing.

The example text analyzer 220 of the illustrated example of FIG. 2 analyzes the searchable text for similarities to text stored in A/V database 155 corresponding to known interfaces of malicious macros. To perform the analysis and determine a similarity score, the example text analyzer 220 uses, for example, a Levenshtein Distance function, Latent Semantic Analysis, etc. The example text analyzer 220 uses the searchable text to compare the text elements present in the user interface with text elements stored in A/V database 155 known to indicate the presence of a malicious macro. The example text analyzer 220 produces a similarity score which is compared to a similarity threshold determining the existence of a text match. If the similarity score meets or exceeds the similarity threshold, a match is found. In some examples, the text analyzer 220 implements means for analyzing.

The example responder 222 of the illustrated example of FIG. 2 performs a responsive action in response to the similarity analyzer 210 detecting a malicious interface. In some examples, the example responder 222 is implemented by a process controller 225, which controls user interaction with the macro-executing process. Such control may, for example, limit further interaction with the macro-executing process by the user, and in some examples requires additional user interaction prior to allowing the execution of the macro. In some examples, the process controller 225 may close the malicious application and/or prevent the user from enabling the macro. In some examples, the responder 222 implements means for responding.

In some examples, the responder 222 is implemented by the alert transmitter 230, which communicates an alert indicative of the identification of the malicious interface. In some examples, the alert transmitter 230 communicates the alert to the remote central repository 105. In some examples, the alert transmitter 230 communicates the alert to the anti-virus package 140.

In some examples, the responder 222 is implemented by the example error displayer 235, which causes display of a warning message to the user (e.g., via a pop-up). The warning message may, for example, indicate the danger of continued use of the macro-executing application (e.g., indicate that there is a likelihood of the presence of malicious instructions within the macro). In some examples, the warning message is implemented using a pop-up message to the user. This warning message can be displayed as a warning to the user against further interaction, or in connection with the process controller 225 that closes or locks the application interface.

While an example manner of implementing the application monitor 150 of FIG. 1 is illustrated in FIG. 2, one or more of the elements, processes and/or devices illustrated in FIG. 2 may be combined, divided, re-arranged, omitted, eliminated and/or implemented in any other way. Further, the example process detector 202, the example image capturer 205, the example similarity analyzer 210, the example character recognizer 215, the example text analyzer 220, the example responder 222, the example database interface 250, and/or, more generally, the example application monitor 150 of FIG. 2 may be implemented by hardware, software, firmware and/or any combination of hardware, software and/or firmware. Thus, for example, any of the example process detector 202, the example image capturer 205, the example similarity analyzer 210, the example character recognizer 215, the example text analyzer 220, the example responder 222, the example database interface 250, and/or, more generally, the example application monitor 150 of FIG. 2 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example process detector 202, the example image capturer 205, the example similarity analyzer 210, the example character recognizer 215, the example text analyzer 220, the example responder 222, the example database interface 250, and/or, more generally, the example application monitor 150 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example application monitor 150 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
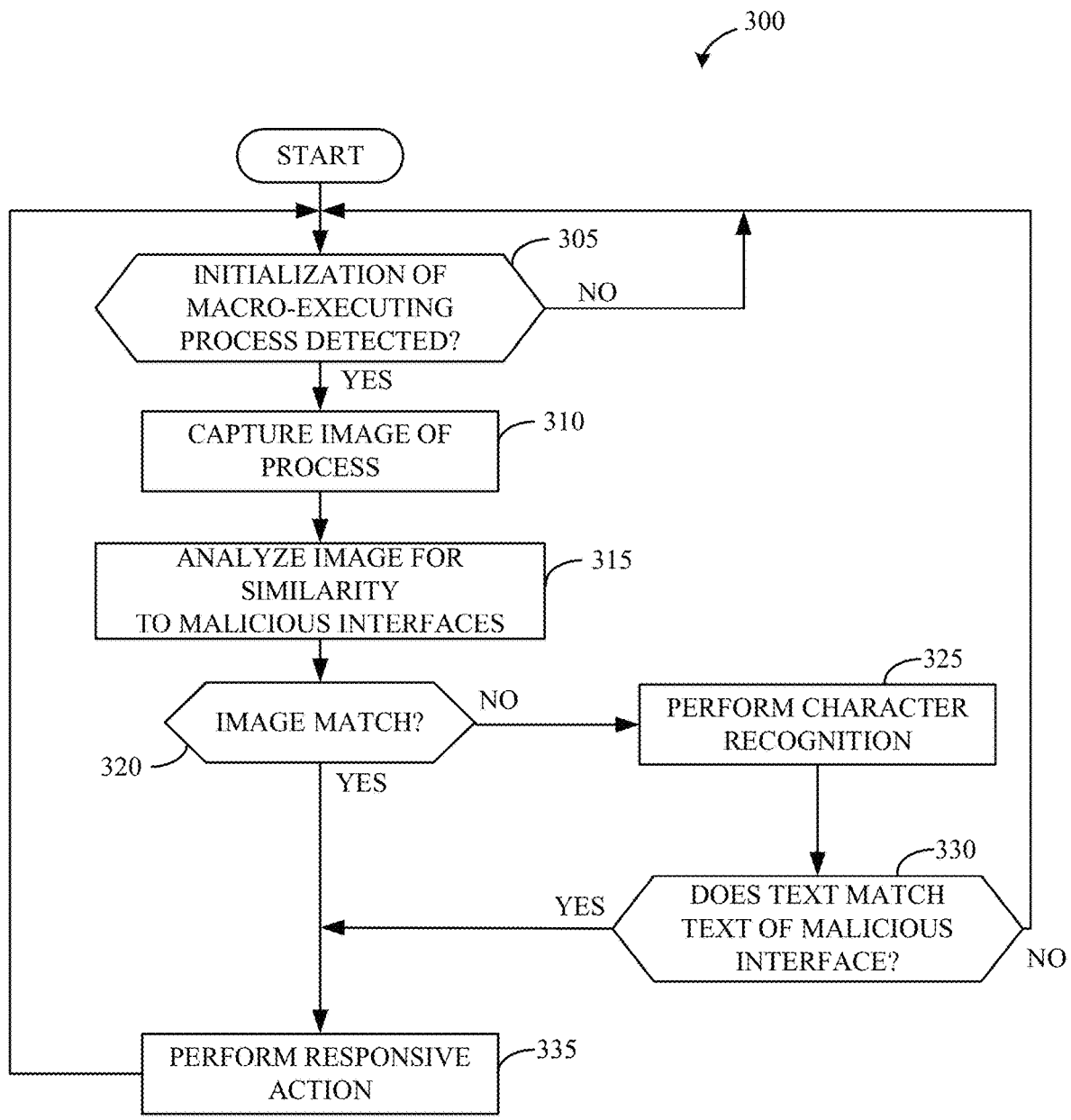
FIG. 3 is a flowchart representative of example machine-readable instructions which, when executed, cause the application monitor of FIGS. 1 and 2 to detect presence of a malicious macro.
Figure 4:
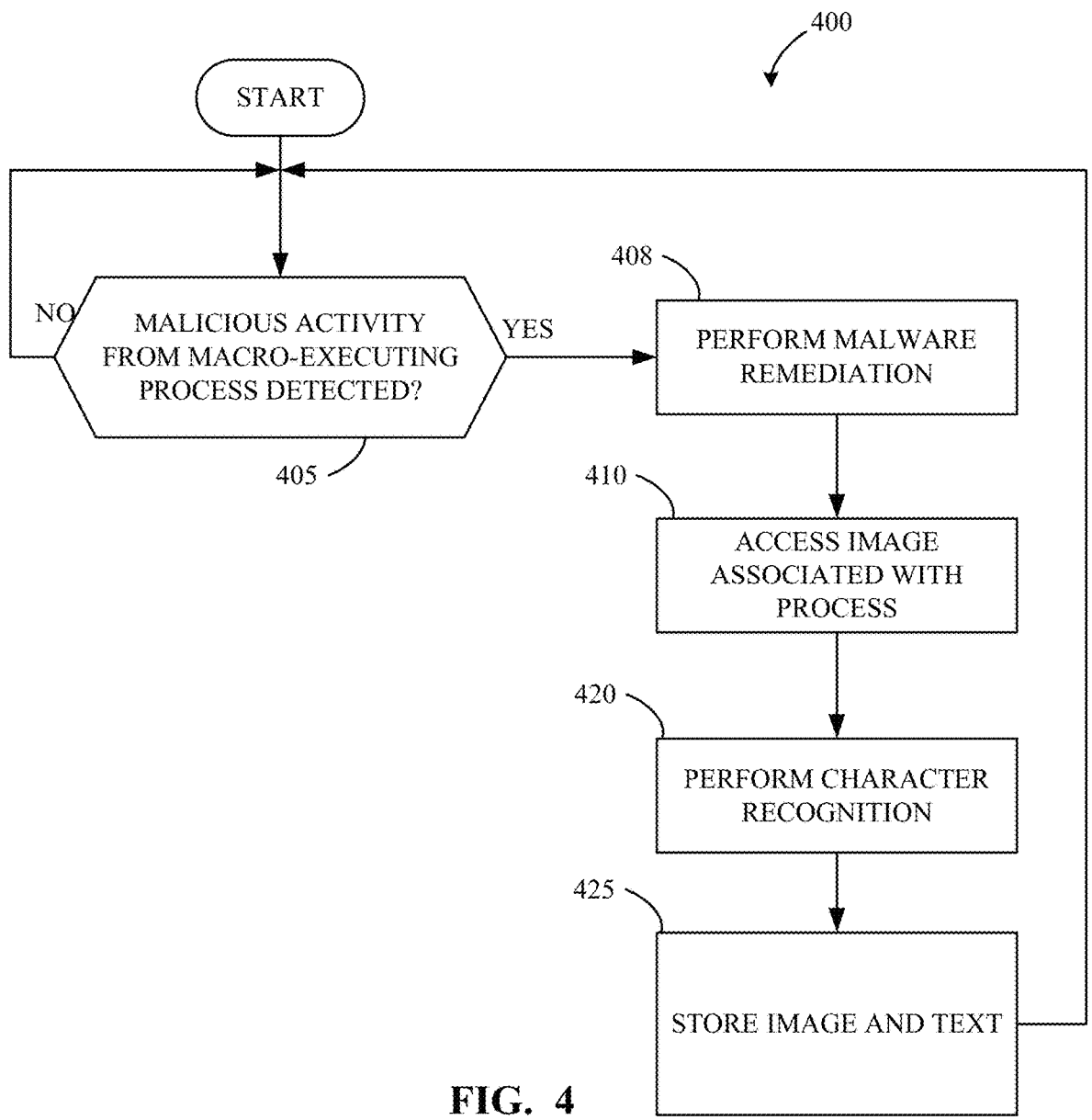
FIG. 4 is a flowchart representative of example machine-readable instructions which, when executed, cause the example anti-virus process of FIG. 1 to detect malware.

A flowchart representative of example hardware logic, machine readable instructions, hardware implemented state machines, and/or any combination thereof for implementing the application monitor 150 of FIGS. 1 and/or 2 is shown in FIG. 3. A flowchart representative of example hardware logic, machine readable instructions, hardware implemented state machines, and/or any combination thereof for implementing the example anti-virus package 140 of FIG. 1 is shown in FIG. 4. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3 and/or 4, many other methods of implementing the example application monitor 150 and/or the example anti-virus package 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart illustrating example machine readable instructions 300 that may be executed by the example application monitor 150 to perform malware detection via the analysis of a screen capture. The example instructions 300 of FIG. 3 begins at block 305 where the example process detector 202 detects a macro-executing process. (Block 305). The example process detector 202 detects the execution of the macro-executing process by detecting processes executing on the user device, and comparing a process name (and/or an executable name associated with the process) to a list of known macro-executing processes stored in the antivirus database 155. The list of known macro-executing processes may include, for example, "winword.exe," "excel.exe," etc. which indicate the execution of a macro-executing process. In some examples, the file extension of the opened file is checked to see if the extension indicates the opening of a program that uses macros. In other examples, a cursory scan of the file can be performed to determine the presence of a macro. The list of known macro-executing processes can be updated based on an external source and in some examples, the process name can also be checked against the external source.

If the process detector 202 determines that the macro-executing process is not being executed, (e.g., block 305 returns a result of NO), the example process detector 202 continues to monitor for execution of the macro-executing process. If the process detector 202 determines that the macro-executing process is being executed (e.g., block 305 returns a result of YES), the image capturer 205 captures an image of a user interface associated with the process (block 310). In examples disclosed herein, the image capturer 205 captures the image using, for example, screen buffer data describing the content present on a display of the client device. In some examples, the screen capture is cropped to include only the interface of the macro-executing process. In other examples, the screen capture is cropped further to contain only the application interface of the macro-executing process (e.g., to exclude menu sections of the application interface, to exclude ribbon sections of the application interface, etc.). The image can be cropped using techniques such as Canny Edge Detection. Further analysis can exclude screen interface elements outside of the application window.

The similarity analyzer 210 analyzes the captured image for similarities to known malicious macro interface images stored in the local A/V database 155. (Block 315). In some examples, the A/V database 155 is synchronized periodically (e.g., daily, weekly, monthly) with the central repository 105. In other examples, A/V database 155 is synchronized during the installation of a malware detector. The similarity analyzer 210 uses, for example, Scale-Invariant Feature Transform (SIFT), Structural Similarity Index Measure (SSIM), to generate a similarity score for the captured image against one or more images stored in A/V database 155. Based on whether the similarity score meets or exceeds a similarity threshold, the example similarity analyzer 210 determines whether an image match is found. (Block 320).

If an image match is not found (e.g., block 320 returns a result of NO), character recognizer 215 searches the image for textual elements. (Block 325). The character recognizer 215 uses, for example, Optical Character Recognition (OCR) to output searchable text corresponding to the characters present in the image. The text analyzer 220 analyzes the searchable text for similarities to text stored in A/V database 155 corresponding to known interfaces of malicious macros. To perform the analysis and determine a similarity score, the example text analyzer 220 uses, for example, a Levenshtein Distance function, Latent Semantic Analysis, etc. If the similarity score meets or exceeds a similarity threshold, a text match is found. (Block 330). If a text match is found, (e.g., block 330 returns a result of YES), a responsive action is performed by the responder 222. (Block 335). Similarly, if an image match is found, (e.g., block 320 returns a result of YES), the example responder 222 performs a responsive action. (Block 335).

In response to either the image being identified as representing a malicious macro (e.g., block 320 returning a result of YES) or the text within the image being identified as representing the malicious macro (e.g., block 330 returning a result of YES), the example responder 222 performs the responsive action. (Block 335). For example, the example responder 222 may implement the process controller 225 to control user interaction with the macro-executing process. Such control may, for example, limit further interaction with the macro-executing process by the user, require additional user interaction prior to allowing the execution of the macro. In some examples, the process controller 225 may close the malicious application or prevent the ability of the user to enable the macro.

In some examples, the example responder 222 may implement the example alert transmitter 230 to communicate an alert to the remote central repository 105, or communicate with an installed anti-virus program. With this information, the remote central repository can flag the captured interface and text as indicative of a malicious-macro.

In some examples, the example responder 222 may implement the example error displayer 235 to cause the display of a warning message to the user (e.g., via a pop-up). The warning message may, for example, indicate the danger of continued use of the macro-executing application (e.g., indicate that there is a likelihood of the presence of malicious instructions within the macro). In some examples, a warning message is implemented using a pop-up message to the user. This warning message can be displayed as a warning to the user against further interaction, or in connection with the process controller 225 closing or locking the application interface. If the text analyzer 220 does not find a match, (e.g., block 330 returns a result of NO), no responsive action is performed, and control returns to block 305, where the example process detector 202 continues to monitor for execution of the macro-executing process.

After performance of the responsive action (Block 335) or the determination that the text of the user interface does not match text of the malicious interface (e.g., Block 330 returning a result of NO), control returns to block 305 where the example process detector 202 monitors for subsequent initialization of a macro-executing process. Such initialization may include, for example opening of a second and/or subsequent document (e.g., with a previously executing process).

FIG. 4 is a flowchart representative of example machine-readable instructions 400 that may be executed to implement the example anti-virus package 140 of FIG. 1. The example instructions 400 of FIG. 4 begins at block 405 where the anti-virus package 140 monitors for malicious activity performed by a macro-executing process. (Block 405). Malicious activity may be detected, for example, if the interface did not trigger a responsive action (e.g., did not match a known malicious interface with the requisite degree of similarity) and a user were to accept execution of the malicious macro. If no malicious activity is detected (e.g., block 405 returns a result of NO), control returns to block 405, where the anti-virus package 140 continues to monitor for malicious macro activity.

If the example anti-virus package 140 detects malicious activity (e.g., block 405 returns a result of YES), the example anti-virus package 140 performs malware remediation. (Block 408). Such malware remediation may include, for example, terminating execution of the malicious process, alerting a user, etc.

To enhance the likelihood that subsequent execution of the malicious document triggers the application monitor 150, the example anti-virus package 140 accesses the image associated with the process (e.g., the application interface screen capture). (Block 410). The example anti-virus package 140 performs character recognition on the image to translate visual text elements into searchable text. (Block 420). In some examples, the anti-virus package 140 interfaces with the character recognizer 215 of the application monitor 150 to perform such character recognition.

The captured image and recognized text are stored in the A/V database 155 such that the interface and associated text may later be used to detect a malicious interface. (Block 425). In some examples, the captured image and recognized text are submitted to the central repository 105. In some examples, central repository 105 flags the submitted image and text as a new example of a malicious macro interface. In some examples, further analysis is performed at the server 101 to determine whether the image and associated text should be included in the central repository 105. Such analysis may ensure, for example, that personally identifiable information is not shared. If the submitted image and text are determined to not be useful, for example, for further malicious macro interface identification, they can be deleted without being added to the central repository. After the storage of the image and identified text, control returns to block 405, and awaits the detection of malicious-macro activity.

Figure 5:
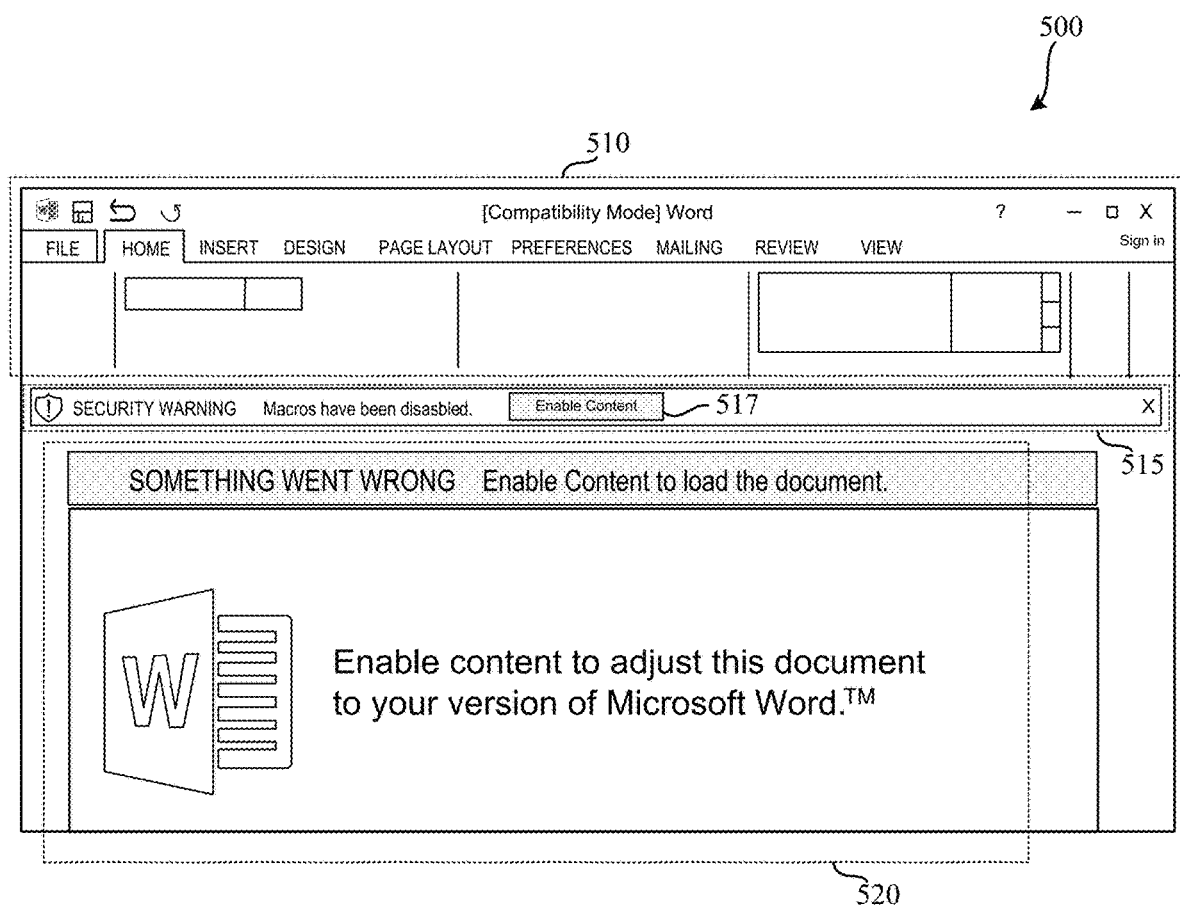
FIG. 5 is an example screen capture and interface that may be compared to known malicious macro interfaces to detect the presence of a malicious macro.

FIG. 5 is an example application interface 500 that may be analyzed for detecting a malicious macro. The example interface 500 includes a menu section 510, a macro-enabling section 515, and a document section 520. The menu section 510 includes menu buttons and other user interface elements to enable the user to interact with the macro-executing process 135. In some examples, when the example image capturer 205 captures an image of the user interface of the macro-executing process 135, the menu section 510 is removed (e.g., cropped) from the image to prevent similarities in the menu section 510 from influencing the degree of similarity of the document section 520 to document sections of malicious macro documents. The example macro-enabling section 515 includes an enable button 517 which, upon being clicked by a user, causes the macro-executing process 135 to enable execution of a macro. In some examples, malicious documents include instructions that request that the user click on the enable button 517. For example, the document section 520 of the illustrated example of FIG. 5 includes an interface that is meant to instruct the user to click the enable button 517. In the illustrated example of FIG. 5, the document section 520 includes text indicating that "SOMETHING WENT WRONG," and "Enable content to adjust this document to your version of Microsoft Word™" Non-malicious documents do not typically include such text and/or interface elements. As such, the detection of such text in the document section 520 is likely indicative of a malicious macro.

Figure 6:
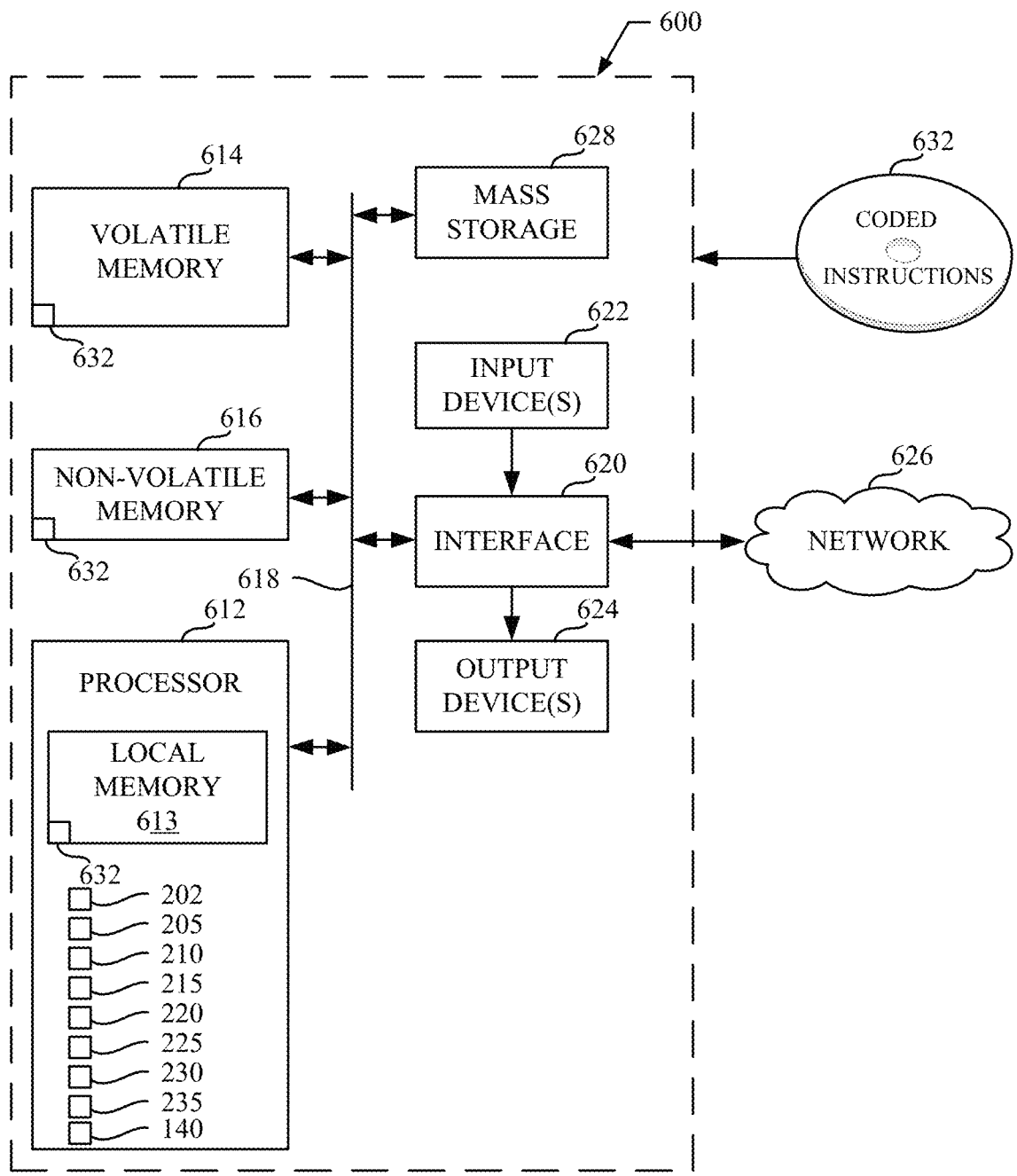
FIG. 6 is a block diagram of an example processor platform structured to execute the instructions of FIGS. 3 and/or 4 to implement the example user device of FIG. 1.

FIG. 6 is a block diagram of an example processor platform 600 structured to execute the instructions of FIGS. 3 and/or 4 to implement the example client device 130 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example application monitor 150 and the example anti-virus package 140.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3 and/or 4 may be stored in the mass storage device 628, in the volatile memory 614, in the non-volatile memory 616, and/or on a removable non-transitory computer readable storage medium such as a CD or DVD.

Figure 7:
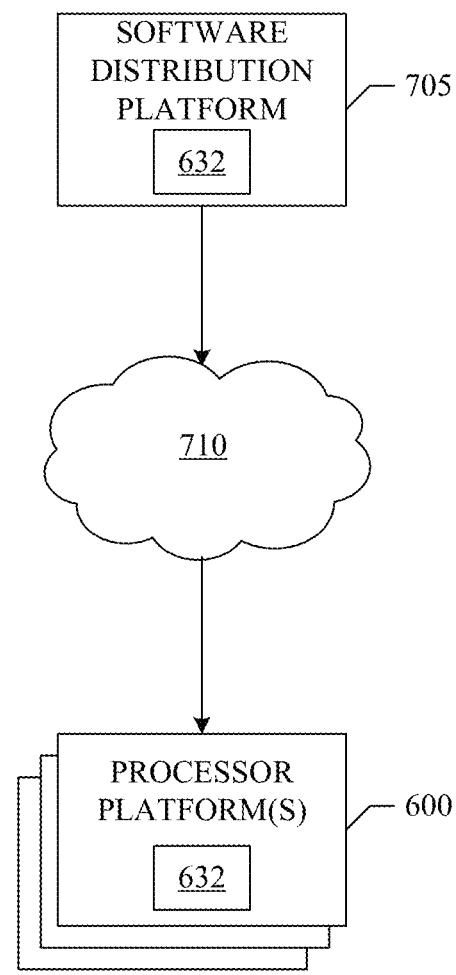
FIG. 7 is a block diagram of an example software distribution platform to distribute software (e.g., software corresponding to the example computer readable instructions of FIGS. 3 and/or 4 to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 705 to distribute software such as the example computer readable instructions 632 of FIG. 6 to third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 632 of FIG. 6. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the computer readable instructions 632, which may correspond to the example computer readable instructions 300, 400 of FIGS. 3 and/or 4, as described above. The one or more servers of the example software distribution platform 705 are in communication with a network 710, which may correspond to any one or more of the Internet and/or any of the example networks 120 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 632 from the software distribution platform 705. For example, the software, which may correspond to the example computer readable instructions 632 of FIG. 6, may be downloaded to the example processor platform 600, which is to execute the computer readable instructions 632 to implement the client device 130. In some example, one or more servers of the software distribution platform 705 periodically offer, transmit, and/or force updates to the software (e.g., the example computer readable instructions 632 of FIG. 6) to ensure improvements, patches, updates, etc. are distributed and applied to the software at the end user devices.

From the foregoing, it will be appreciated that example disclosed methods, apparatus and articles of manufacture improve the efficiency of using a computing device by detecting malware in the form of a macro before the macro can be executed. In so doing, efficiency is gained by removing the need to execute the macro to detect the malicious activities thereof. In this manner, processor cycles are not wasted on execution of malicious instructions. In addition, approaches disclosed herein reduce risk of a malicious macro executing on a user device, thereby avoiding further efforts to undo any malicious effects of the malicious macro including, for example, detection and uninstallation of any malware, rootkits, viruses, etc. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture for detecting malware via analysis of a screen capture are disclosed. Further examples and combinations thereof include the following:

Example 1 includes an apparatus for detecting a malicious macro, the apparatus comprising a process detector to detect execution of a macro-executing process, an image capturer to, in response to detection of the macro-execution process, capture an image of a user interface of the macro-executing process, a similarity analyzer to analyze the image to determine an image similarity to a stored image in a repository of malicious macro interfaces, and a responder to perform a responsive action in response to the image similarity meeting or exceeding a similarity threshold.

Example 2 includes the apparatus of example 1, wherein the similarity analyzer is to analyze the image by obtaining the stored image from a local cache.

Example 3 includes the apparatus of example 2, wherein the local cache is to be synchronized with a central repository of known malicious macro interface images.

Example 4 includes the apparatus of example 1, wherein the similarity threshold is a first similarity threshold, and further including a character recognizer to, in response to the image similarity not meeting or exceeding the similarity threshold, perform character recognition to identify text present in the image of the user interface, and a text analyzer to compare the identified text to stored text, wherein the responder is to perform, in response to a second similarity score of the identified text and the stored text meeting or exceeding a second similarity threshold, the responsive action.

Example 5 includes the apparatus of example 1, wherein the responder is to at least one of prevent further input from the user to the macro-executing process, display an error message to the user, or transmit an alert to a central monitoring facility.

Example 6 includes the apparatus of example 1, further including an anti-virus package to detect that the macro-executing process is performing a malicious activity and, store the image of the user interface in the repository of malicious macro interfaces.

Example 7 includes at least one non-transitory computer readable medium comprising instructions that, when executed, cause at least one processor to at least detect execution of a macro-executing process, in response to detection of the macro-execution process, capture an image of a user interface of the macro-executing process, analyze the image to determine an image similarity to a stored image in a repository of malicious macro interfaces, and perform a responsive action in response to the image similarity meeting or exceeding a similarity threshold.

Example 8 includes the at least one non-transitory computer readable medium of example 7, wherein the instructions, when executed, cause the at least one processor to analyze the image by obtaining the stored image from a local cache.

Example 9 includes the at least one non-transitory computer readable medium of example 8, wherein the instructions, when executed, cause the at least one processor to synchronize the local cache with a central repository of known malicious macro interface images.

Example 10 includes the at least one non-transitory computer readable medium of example 7, wherein the similarity threshold is a first similarity threshold, and the instructions, when executed, cause the at least one processor to, in response to the image similarity not meeting or exceeding the similarity threshold perform character recognition to identify text present in the image of the user interface, compare the identified text to stored text, and perform, in response to a second similarity score of the identified text and the stored text meeting or exceeding a second similarity threshold, the responsive action.

Example 11 includes the at least one non-transitory computer readable medium of example 7, wherein the instructions, when executed, cause the at least one processor to, in response to the comparison of the image similarity score to the image similarity threshold, performing at least one of prevent further input from the user to the macro-executing process, display an error message to the user, or transmit an alert to a central monitoring facility.

Example 12 includes the at least one non-transitory computer readable medium of example 7, wherein the instructions, when executed, cause the at least one processor to detect, with an anti-virus package, that the macro-executing process is performing a malicious activity, and in response to detecting that the macro-executing process is performing the malicious activity, store the image of the user interface.

Example 13 includes a method for detecting a malicious macro, the method comprising detecting execution of a macro-executing process, in response to detection of the macro-execution process, capturing an image of a user interface of the macro-executing process, analyzing the image to determine an image similarity to a stored image in a repository of malicious macro interfaces, and performing a responsive action in response to the image similarity meeting or exceeding a similarity threshold.

Example 14 includes the method of example 13, wherein the analyzing of the image includes obtaining the stored image from a local cache.

Example 15 includes the method of example 14, further including synchronizing the local cache with a central repository of known malicious macro interface images.

Example 16 includes the method of example 13, wherein the similarity threshold is a first similarity threshold, and further including, in response to the image similarity not meeting or exceeding the similarity threshold performing character recognition to identify text present in the image of the user interface, comparing the identified text to stored text, and performing, in response to a second similarity score of the identified text and the stored text meeting or exceeding a second similarity threshold, the responsive action.

Example 17 includes the method of example 13, further including, in response to the comparison of the image similarity score to the image similarity threshold, performing at least one of preventing further input from the user to the macro-executing process, displaying an error message to the user, or transmitting an alert to a central monitoring facility.

Example 18 includes the method of example 13, further including detecting, with an anti-virus package, that the macro-executing process is performing a malicious activity, and in response to detecting that the macro-executing process is performing the malicious activity, storing the image of the user interface.

Example 19 includes an apparatus for detecting a malicious macro, the apparatus comprising means for detecting execution of a macro-executing process, means for capturing to, in response to detection of the macro-execution process, capture an image of a user interface of the macro-executing process, means for analyzing to analyze the image to determine an image similarity to a stored image in a repository of malicious macro interfaces, and means for responding to perform a responsive action in response to the image similarity meeting or exceeding a similarity threshold.

Example 20 includes the apparatus of example 19, wherein the means for analyzing is to analyze the image by obtaining the stored image from a local cache.

Example 21 includes the apparatus of example 20, wherein the local cache is to be synchronized with a central repository of known malicious macro interface images.

Example 22 includes the apparatus of example 19, wherein the similarity threshold is a first similarity threshold, and further including means for recognizing, in response to the image similarity not meeting or exceeding the similarity threshold, perform character recognition to identify text present in the image of the user interface, wherein the means for analyzing is further to compare the identified text to stored text, and the means for responding is to perform, in response to a second similarity score of the identified text and the stored text meeting or exceeding a second similarity threshold, the responsive action.

Example 23 includes the apparatus of example 19, wherein the means for responding is to at least one of prevent further input from the user to the macro-executing process, display an error message to the user, or transmit an alert to a central monitoring facility.

Example 24 includes the apparatus of example 19, further including an anti-virus package to detect that the macro-executing process is performing a malicious activity and, store the image of the user interface in the repository of malicious macro interfaces.

Example 25 includes a server to distribute first software on a network, the server comprising at least one storage device including second instructions, and at least one processor to execute the second instructions to transmit the first instructions over the network, the first instructions, when executed, to cause at least one device to detect execution of a macro-executing process, in response to detection of the macro-execution process, capture an image of a user interface of the macro-executing process, analyze the image to determine an image similarity to a stored image in a repository of malicious macro interfaces, and perform a responsive action in response to the image similarity meeting or exceeding a similarity threshold. The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   at least one processor circuit to be programmed by the machine-readable instructions to:
      capture an image of a user interface after detection of execution of a first malicious macro, the captured image representing a portion of the user interface corresponding to a document section of the first malicious macro;
      perform character recognition on the image to translate a character of the image to a searchable character, the searchable character included in a sequence of searchable characters;
      search a central repository to determine whether the sequence of searchable characters has been previously stored in the central repository;
      in response to a determination that the sequence of searchable characters has not been previously stored in the central repository, allow the execution of the first malicious macro;
      perform, after identification of malicious activity associated with the first malicious macro, a responsive action to remediate the execution of the first malicious macro; and
      after identification of the malicious activity associated with the first malicious macro, store the captured image and the sequence of searchable characters, the captured image and the sequence of searchable characters to be used to detect a second malicious macro.

2. The apparatus of claim 1, wherein the responsive action is to cause termination of the execution of the first malicious macro.

3. The apparatus of claim 1, wherein the responsive action is to cause presentation of an alert regarding the identification of the malicious activity associated with the first malicious macro.

4. The apparatus of claim 1, wherein the malicious activity includes an enabled macro that does not satisfy a similarity threshold to known malicious macros.

5. The apparatus of claim 1, wherein, to store the captured image and the sequence of searchable characters, one or more of the at least one processor circuit is to submit the captured image and the sequence of searchable characters as a new malicious macro to the central repository, the central repository stored in a server.

6. The apparatus of claim 5, wherein, to store the captured image and the sequence of searchable characters, one or more of the at least one processor circuit is to determine whether to include the captured image and the sequence of searchable characters as the new malicious macro in the central repository.

7. The apparatus of claim 6, wherein the determination of whether to include the captured image and the sequence of searchable characters in the central repository is based on whether the captured image and the sequence of searchable characters contain personal information.

8. The apparatus of claim 6, wherein the determination of whether to include the captured image and the sequence of searchable characters in the central repository is based on whether the captured image and the sequence of searchable characters are useful for further malicious macro identification.

9. At least one non-transitory machine-readable medium comprising machine-readable instructions to cause at least one processor circuit to at least:
   capture an image of a user interface after detection of execution of a first malicious macro, the captured image representing a portion of the user interface corresponding to a document section of the first malicious macro;
   perform character recognition on the image to translate a character of the image to a searchable character, the searchable character included in a sequence of searchable characters;
   search a central repository to determine whether the sequence of searchable characters has been previously stored in the central repository;
   in response to a determination that the sequence of searchable characters has not been previously stored in the central repository, allow the execution of the first malicious macro;
   perform, after identification of malicious activity associated with the first malicious macro, a responsive action to remediate the execution of the first malicious macro; and
   after identification of the malicious activity associated with the first malicious macro, store the captured image and the sequence of searchable characters, the captured image and the sequence of searchable characters to be used to detect a second malicious macro.

10. The at least one non-transitory machine-readable medium of claim 9, wherein the machine-readable instructions are to cause one or more of the at least one processor circuit to cause termination of the execution of the first malicious macro as the responsive action.

11. The at least one non-transitory machine-readable medium of claim 9, wherein the machine-readable instructions are to cause one or more of the at least one processor circuit to cause presentation of an alert regarding the identification of the malicious activity associated with the first malicious macro as the responsive action.

12. The at least one non-transitory machine-readable medium of claim 9, wherein the malicious activity includes an enabled macro that does not satisfy a similarity threshold to known malicious macros.

13. The at least one non-transitory machine-readable medium of claim 9, wherein, to store the captured image and the sequence of searchable characters, the machine-readable instructions are to cause one or more of the at least one processor circuit to submit the captured image and the sequence of searchable characters as a new malicious macro to the central repository, the central repository stored in a server.

14. The at least one non-transitory machine-readable medium of claim 13, wherein, to store the captured image and the sequence of searchable characters, the machine-readable instructions are to cause one or more of the at least one processor circuit to determine whether to include the captured image and the sequence of searchable characters as the new malicious macro in the central repository.

15. The at least one non-transitory machine-readable medium of claim 14, wherein the determination of whether to include the captured image and the sequence of searchable characters in the central repository is based on whether the captured image and the sequence of searchable characters contain personal information.

16. The at least one non-transitory machine-readable medium of claim 14, wherein the determination of whether to include the captured image and the sequence of searchable characters in the central repository is based on whether the captured image and the sequence of searchable characters are useful for further malicious macro identification.

17. A method comprising:
   capturing, by at least one processor circuit programmed by at least one instruction, an image of a user interface after detection of execution of a first malicious macro, the captured image representing a portion of the user interface corresponding to a document section of the first malicious macro;
   performing character recognition on the image to translate a character of the image to a searchable character, the searchable character included in a sequence of searchable characters;
   searching a central repository to determine whether the sequence of searchable characters has been previously stored in the central repository;
   in response to a determination that the sequence of searchable characters has not been previously stored in the central repository, allowing the execution of the first malicious macro;
   performing, by one or more of the at least one processor circuit, after identification of malicious activity associated with the first malicious macro, a responsive action to remediate the execution of the first malicious macro; and
   after identification of the malicious activity associated with the first malicious macro, storing the captured image and the sequence of searchable characters, the captured image and the sequence of searchable characters to be used to detect a second malicious macro.

18. The method of claim 17, wherein performing the responsive action further includes causing termination of the execution of the first malicious macro and causing presentation of an alert regarding the identification of the malicious activity associated with the first malicious macro.

19. The method of claim 17, wherein the storing of the captured image and the sequence of searchable characters further includes:
   submitting the captured image and the sequence of searchable characters as a new malicious macro to the central repository, the central repository stored in a server; and
   determining whether to include the captured image and the sequence of searchable characters as the new malicious macro in the central repository.

20. The method of claim 19, wherein determining whether to include the captured image and the sequence of searchable characters in the central repository is based on whether the captured image and the sequence of searchable characters contain personal information and are useful for further malicious macro identification.

* * * * *